United States Patent
Pinarbasi

(10) Patent No.: US 6,430,013 B1
(45) Date of Patent: Aug. 6, 2002

(54) MAGNETORESISTIVE STRUCTURE HAVING IMPROVED THERMAL STABILITY VIA MAGNETIC BARRIER LAYER WITHIN A FREE LAYER

(75) Inventor: Mustafa Pinarbasi, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/456,043

(22) Filed: Dec. 6, 1999

(51) Int. Cl.[7] ................................................ G11B 5/39
(52) U.S. Cl. ................................................ 360/324.12
(58) Field of Search .................... 360/324.12, 324.11, 360/324.1, 314

(56) References Cited

U.S. PATENT DOCUMENTS

| | | |
|---|---|---|
| 5,287,238 A | 2/1994 | Baumgart et al. |
| 5,422,571 A | 6/1995 | Gurney et al. |
| 5,432,734 A | 7/1995 | Kawano et al. |
| 5,585,199 A | 12/1996 | Kamiguchi et al. |
| 5,608,593 A | 3/1997 | Kim et al. |
| 5,648,885 A | 5/1997 | Nishioka et al. |
| 5,716,719 A | 2/1998 | Saito et al. |
| 5,738,946 A | 4/1998 | Iwaski et al. |
| 5,764,056 A | 6/1998 | Mao et al. |
| 5,784,225 A | 7/1998 | Saito et al. |
| 5,841,692 A | 11/1998 | Gallagher et al. |
| 5,850,323 A | 12/1998 | Kanai |
| 5,862,021 A | 1/1999 | Deguchi et al. |
| 5,866,212 A | 2/1999 | Kurosawa et al. |
| 5,869,963 A | 2/1999 | Saito et al. |
| 5,872,502 A | 2/1999 | Fujikata et al. |
| 5,896,252 A * | 4/1999 | Kanai |
| 5,923,504 A * | 7/1999 | Araki et al. |
| 5,949,622 A * | 9/1999 | Kamiguchi et al. |
| 5,986,858 A * | 11/1999 | Sato et al. |
| 6,052,262 A * | 4/2000 | Kamiguchi et al. |
| 6,114,850 A * | 9/2000 | Hayashi |
| 6,154,349 A * | 11/2000 | Kanai et al. ........... 360/324.12 |

FOREIGN PATENT DOCUMENTS

| | | |
|---|---|---|
| JP | 03-181008 | 8/1991 |
| JP | 05-062127 | 3/1993 |
| JP | 08-153314 | 6/1996 |
| JP | 08-235540 | 9/1996 |
| JP | 409083039 A | 3/1997 |
| JP | 410154618 A | 6/1998 |
| JP | 410289421 A | 10/1998 |

OTHER PUBLICATIONS

By Tanaka, Shimizu, Kishi, Nagasaka & Oshiki; Dual Spin–Valve with Pd–Pt–Mn Anti–Ferromagnetic Layer; © Sep. 1997; IEEE Transactions on Magnetics, vol. 33, No. 5; Fujitsu Limited, Fujitsu Laboratories Ltd. 10–1 Morinosato–Wakamiya, Atsugi 243–01, Japan.

Takashi Umemoto, et al., CoFe/IRMn Spin–Valves Prepared on Cu Islands, IEEE Transaction On Magnetics, vol. 34, No. 4, pp. 960–962 Jul. 1998.

Mutsuko Jimbo, et al., Giant Magnetoresistance In Soft Magnetic NiFeCo/Cu Multilayers With Various Buffer Layers, Journal of Magnetism and Magnetic Materials 126 (1993) pp. 422–424, North Holland.

* cited by examiner

*Primary Examiner*—Craig A. Renner
(74) *Attorney, Agent, or Firm*—Blakely, Sokoloff, Taylor & Zafman

(57) ABSTRACT

An apparatus is described having a portion of a magnetoresistive structure wherein the portion of the magnetoresistive structure includes an oxide seed layer formed upon a substrate; and, a free layer formed upon the oxide seed layer. The free layer comprises a magnetic barrier layer formed over the oxide seed layer. The free layer comprises a magnetic layer formed over the magnetic barrier layer. The magnetic barrier layer has a thickness that prevents reaction between the magnetic layer and the oxide seed layer.

16 Claims, 6 Drawing Sheets

MAGNETORESISTIVE STRUCTURE HAVING IMPROVED THERMAL STABILITY VIA MAGNETIC BARRIER LAYER WITHIN A FREE LAYER

FIELD OF INVENTION

The field of invention relates to direct access data storage, generally. More specifically, the invention relates to the improved thermal stability of GMR based SV sensors for use within magnetic heads.

BACKGROUND OF THE INVENTION

Hardware systems often include memory storage devices having media on which data can be written to and read from. A direct access storage device (DASD or disk drive) incorporating rotating magnetic disks are commonly used for storing data in magnetic form. Magnetic heads, when writing data, record concentric, radially spaced information tracks on the rotating disks. Magnetic heads also typically include read sensors that read data from the tracks on the disk surfaces.

In high capacity disk drives, magnetoresistive (MR) read sensors, the defining structure of MR heads, can read stored data at higher linear densities than thin film heads. A MR head detects the magnetic field(s) through the change in resistance of its MR sensor. The resistance of the MR sensor changes as a function of the direction of the magnetic flux that emanates from the rotating disk.

One type of MR sensor, referred to as a giant magnetoresistive (GMR) effect sensor, takes advantage of the GMR effect. In GMR sensors, the resistance of the MR sensor varies with direction of flux from the rotating disk and as a function of the spin dependent transmission of conducting electrons between magnetic layers separated by a non-magnetic layer (commonly referred to as a spacer) and the accompanying spin dependent scattering within the magnetic layers that takes place at the interface of the magnetic and non-magnetic layers.

GMR sensors using only two layers of magnetic material separated by a layer of GMR promoting non-magnetic material are generally referred to as spin valve (SV) sensors. In an SV sensor, one of the magnetic layers, referred to as the pinned layer, has its magnetization "pinned" by exchange coupling with an antiferromagnetic layer. Due to the relatively high internal anisotropy field associated with the pinned layer, the magnetization direction of the pinned layer typically does not rotate from the flux lines that emanate from the rotating disk. The magnetization direction of another magnetic layer (commonly referred to as a free layer), however, is free to rotate with respect to the flux lines that emanate from the rotating disk.

FIG. 1 shows a prior art SV sensor structure 100 comprising a seed oxide layer 102 formed upon a substrate layer 101. The seed oxide layer 102 helps properly form the microstructure of free magnetic layer 103. Note that free magnetic layer 103 may be a multilayer structure having two or more magnetic layers (e.g., layers 103a, 103b). The non-magnetic spacer 104 and pinned 105 layers are formed atop free magnetic layer 103. Finally, the antiferromagnetic (AFM) layer 106, used to pin the magnetization direction of the pinned layer 105, is formed atop the pinned layer 105.

A problem with structures such as or similar to that shown in FIG. 1 is the degradation of the magnetoresistive effect after one or more high temperature anneals (which are typically performed in manufacturing environments). FIG. 2 shows the degradation of MR effect, as a function of annealing temperature, that has been observed for a particular SV sensor structure similar to that of FIG. 1. A structure exhibiting improved MR effect degradation, along with other possible advantages, is desirable.

SUMMARY OF THE INVENTION

An apparatus comprising an oxide layer, a magnetic barrier layer over the oxide layer and a magnetic layer over the magnetic barrier layer. The magnetic barrier layer has a thickness that prevents reaction between the magnetic layer and the oxide layer.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An apparatus having an oxide layer, a magnetic barrier layer over the oxide layer and a magnetic layer over the magnetic barrier layer. The magnetic barrier layer has a thickness that prevents reaction between the magnetic layer and the oxide layer.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 1:
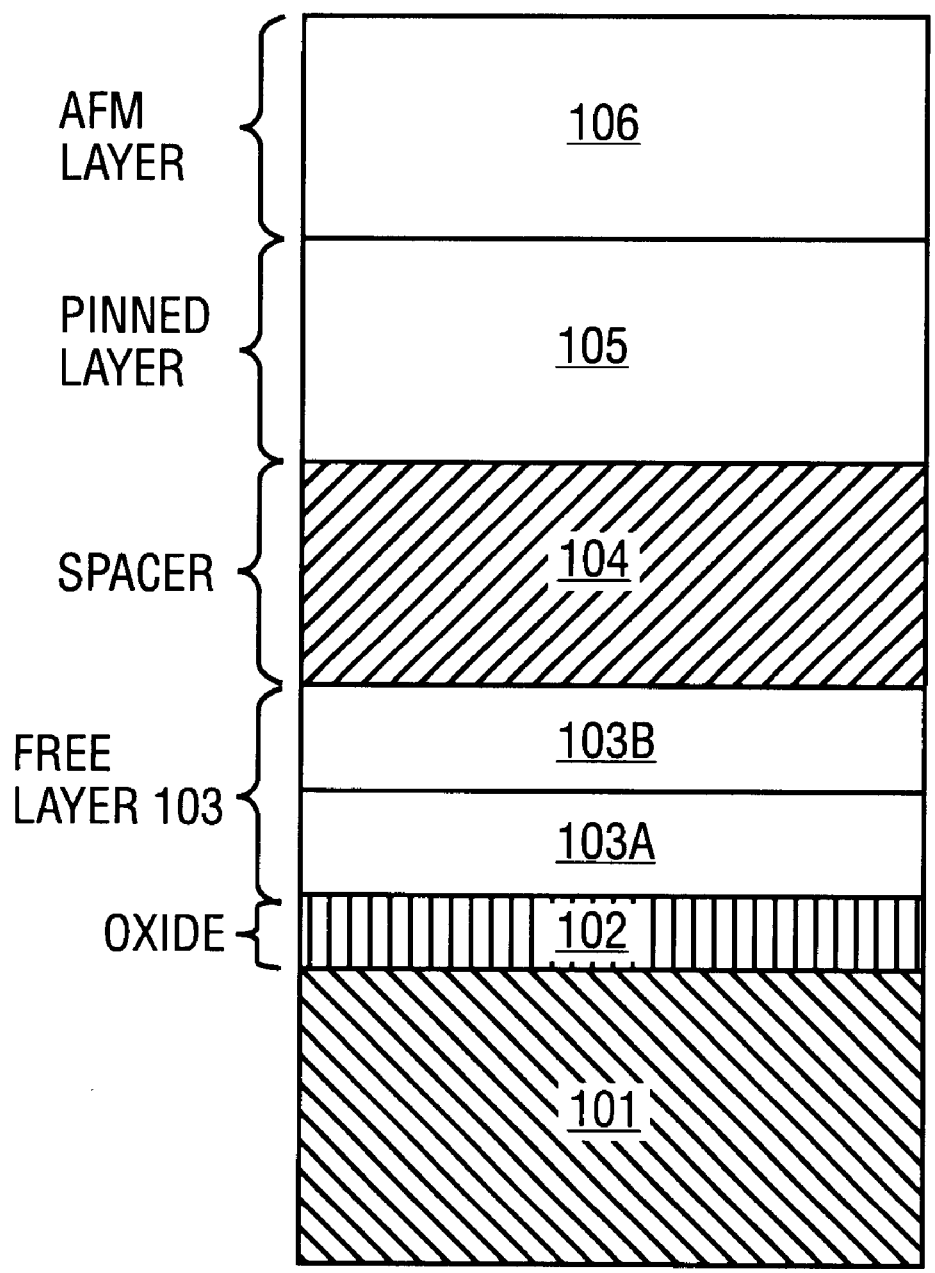
FIG. 1 shows a prior art SV sensor.

In the prior art structure of FIG. 1, the free magnetic layer 103 is a multilayer structure having a first layer 103a of $Ni_{82}Fe_{18}$ and a second layer 103b of $Co_{90}Fe_{10}$. The thickness moments of each layer 103a, 103b correspond to 45 Å and 15 Å of $Ni_{82}Fe_{18}$, respectively. That is, since the magnetic moment per unit volume of $Co_{90}Fe_{10}$ has approximately 1.75 the magnetic moment of $Ni_{82}Fe_{18}$ per unit volume, the actual thickness of the $Co_{90}Fe_{10}$ layer 103b is approximately 8.6 Å (15/1.75=8.6) while the $Ni_{82}Fe_{18}$ layer 103a is, as stated, 45 Å thick. The non-magnetic spacer 104 is a 24 Å thick layer of Copper (Cu) and the pinned layer 105 is a layer of $Co_{90}Fe_{10}$ having a magnetic moment equivalent to 27 Å of $Ni_{82}Fe_{18}$. The antiferromagnetic (AFM) layer 106 is 80 Å of IrMn. The structure 100 is capped with 50 Å of Tantalum.

Figure 2:
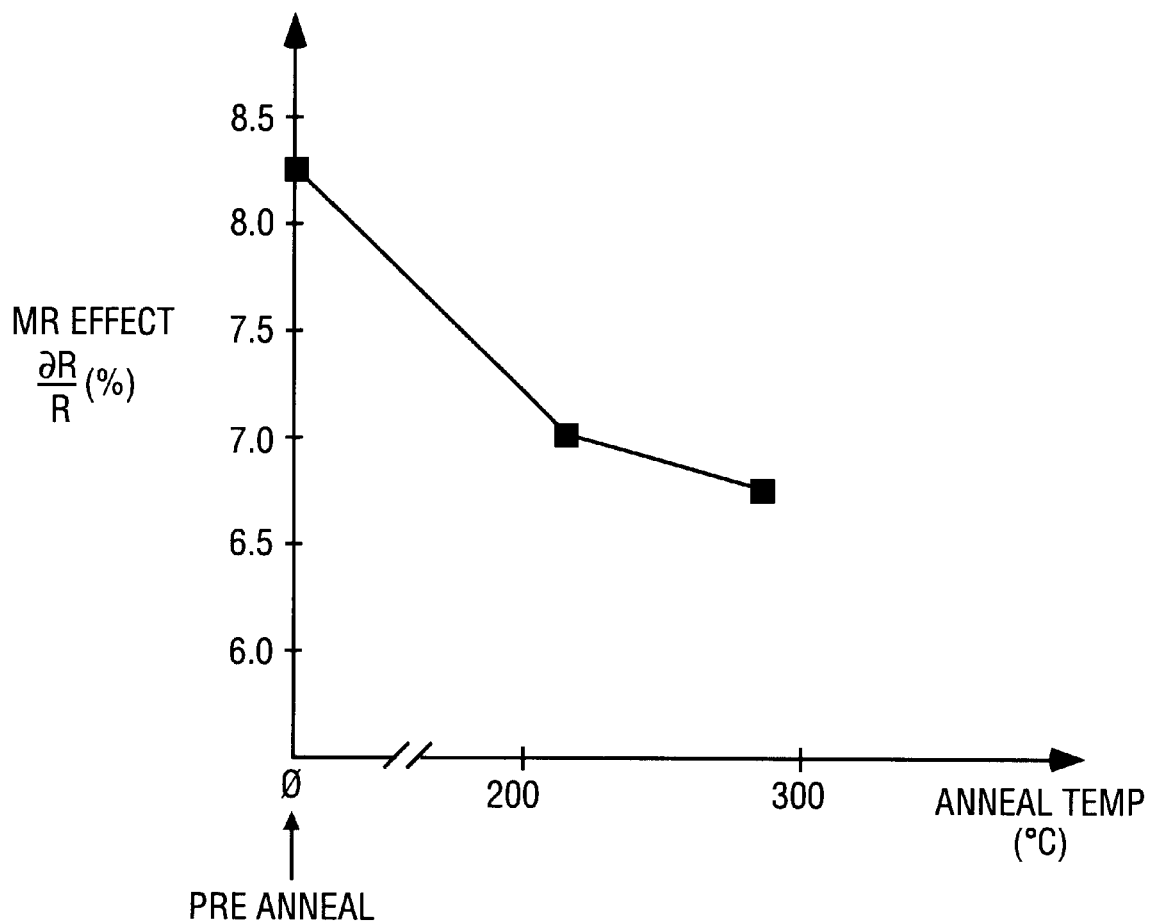
FIG. 2 shows data indicating a temperature instability associated with prior art SV sensors such as that shown with respect to FIG. 1.

The MR effect degradation shown with respect to FIG. 2 is believed to occur as a result of reaction(s) between the $Ni_{82}Fe_{18}$ layer 103a and the oxide seed layer 102 during the high temperature anneal. One theory suggests that the seed layer 102 contributes to the oxidation of the Fe atoms associated with the $Ni_{82}Fe_{18}$ layer 103a. As such $Ni_{82}Fe_{18}$ layer 103a may promote or otherwise fail to deter its reaction with seed layer 102.

This may result in large amounts of relatively non-magnetic material near the seed layer 102/free layer 103 interface or within the free layer 103, large amounts of ferrite material within free layer 103 or an unfavorably altered microstructure within free layer 103. The effect to the free layer 103 of any of these mechanisms may result in reduced magnetoresistance properties and/or reduced magnetic moment which may explain the observed degradation of FIG. 2.

Figure 3:
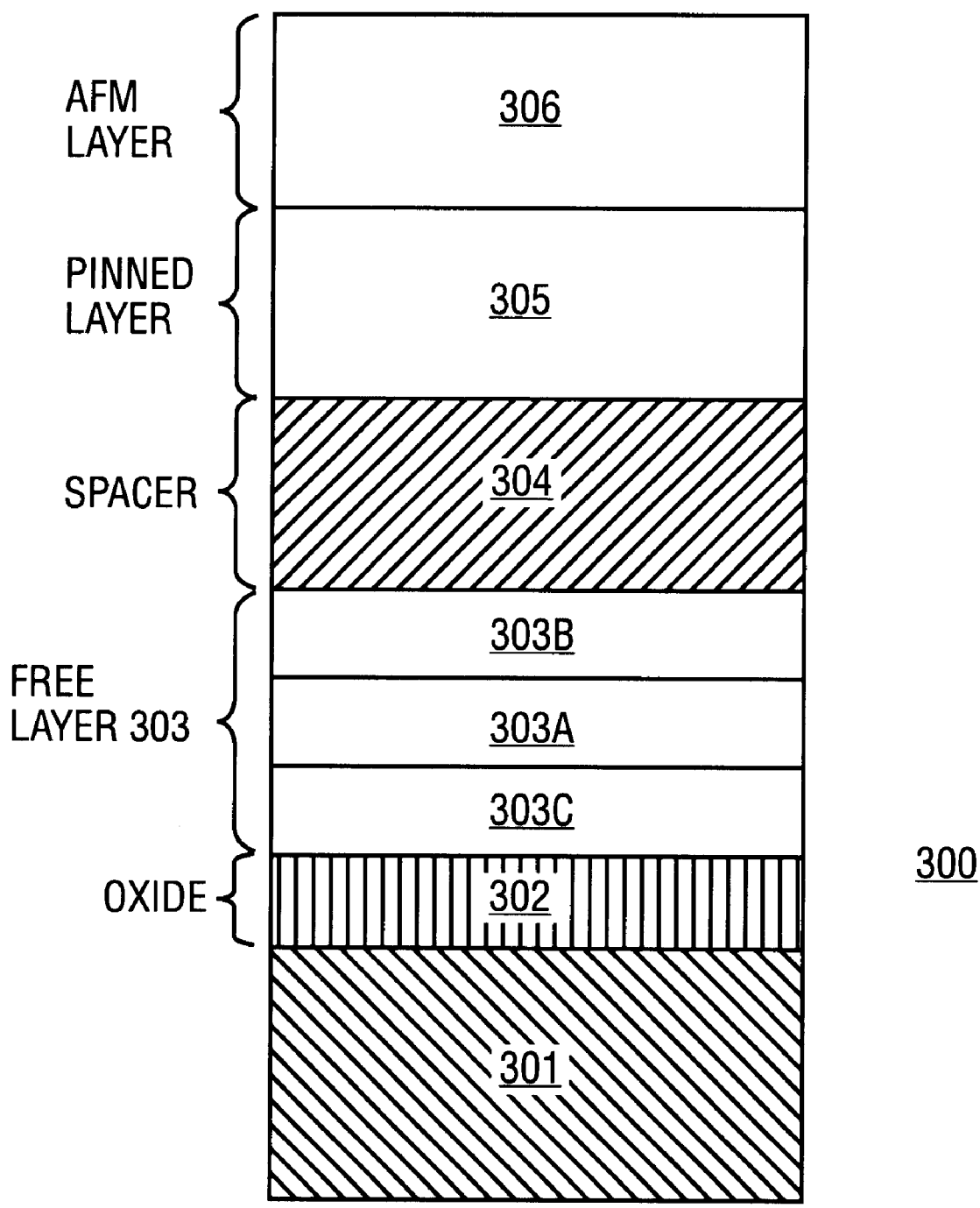
FIG. 3 shows an embodiment of an SV structure that corrects for the temperature instability of FIG. 2.

An approach undertaken to reduce the degradation observed in FIG. 2, is to place a magnetic barrier layer after the seed layer 102. FIG. 3 shows such a structure. Note that since the barrier layer 303c is magnetic, it may be viewed as a portion of free layer 303. As such, in the embodiment shown with respect to FIG. 3, free layer 303 is a multilayer structure having a magnetic barrier layer 303c and two layers 303a, 303b similar to layers 103a, 103b of FIG. 1.

Similar to FIG. 1, layers 303a, 303b are $Ni_{82}Fe_{18}$ and $Co_{90}Fe_{10}$ respectively. The thickness of the $Ni_{82}Fe_{18}$ layer 303a has been reduced with respect to the $Ni_{82}Fe_{18}$ layer 103a of FIG. 1, however, in order to keep the magnetic moment of free layers 103, 303 approximately the same. That is, since the barrier layer 303c is magnetic, its presence will add to the total magnetic moment of the free layer 303.

In order to keep the magnetic moment of the free layer 303 of the SV sensor structure 300 of FIG. 3 approximately the same as the magnetic moment of the free layer 103 of the SV sensor structure 100 of FIG. 1, the thickness of the $Ni_{82}Fe_{18}$ layer 303a of FIG. 3 corresponds to the thickness of the $Ni_{82}Fe_{18}$ layer 103a of FIG. 1 reduced according to the equation:

$$Md_{NiFe3O3a} = Md_{NiFe103a} - Md_{CoFe303c} \qquad \text{Eqn. 1}$$

where Md corresponds to the total magnetic moment of each indicated layer. M is the magnetic moment per unit volume of the material, d is the thickness of the layer where it is assumed for simplicity that the cross sectional areas for each layer are the same.

In one embodiment that corresponds to FIG. 3, the magnetic barrier layer 303c is a thin layer (3 Å) of $Co_{90}Fe_{10}$. 3 Å of $Co_{90}Fe_{10}$ corresponds to a magnetic moment of approximately 5 Å of $Ni_{82}Fe_{18}$. As such, consistent with Equation 1, the thickness of the $Ni_{82}Fe_{18}$ layer 303a of FIG. 3 is 40 Å (as opposed to the 45 Å thick layer 103a shown with respect to FIG. 1). A discussion of the comparison between the observed MR effect of the two structures, 100 of FIG. 1 and 300 of FIG. 3, immediately follows.

Figure 4:
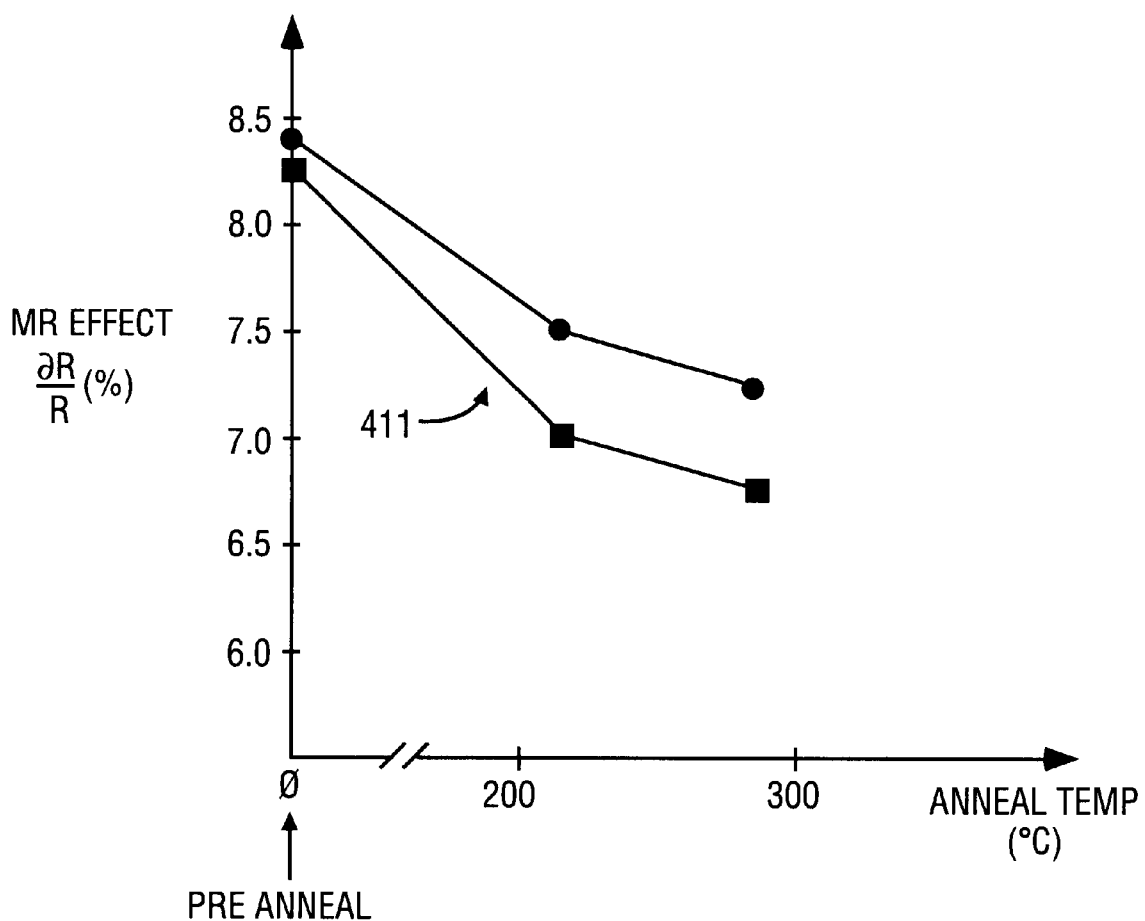
FIG. 4 shows the improvement of the temperature instability obtained from the SV structure of FIG. 3.

FIG. 4 shows the observed improvement in MR effect stability for the SV sensor structure 300 of FIG. 3. FIG. 3 also includes, for comparative purposes, the trend 411 observed originally with respect to FIG. 1. After an 11 hour anneal at 232 C, the SV sensor structure 100 of FIG. 1 exhibits a 15.8% loss in MR effect, as compared to its MR effect value before the anneal step. The SV sensor structure 300 of FIG. 3, however, only exhibits an 11% drop in MR effect. Similarly, after a 6 hour 270 C anneal cycle, the MR effect of structure 100 drops 20% while the MR effect of structure 300 only drops 15%.

A possible explanation for the data observed in FIG. 4 is that the $Co_{90}Fe_{10}$ layer 303c of FIG. 3 prevents or otherwise reduces the reaction between the $Ni_{82}Fe_{18}$ layer 303a and the oxide seed layer 302. Another possible theory that is $Co_{90}Fe_{10}$ layer 303c acts as a seed layer which promotes a microstructure within the free layer 303 (during its formation or anneal) more favorable to the MR effect (e.g., <111> crystal oriented grains).

As such the magnetic properties (particularly the MR effect) of a structure (such as structure 300 of FIG. 3 for example) having a magnetic barrier layer 303c where the magnetic barrier layer 303c has one or more properties that: 1) discourage oxide reaction between an oxide layer 103 and a magnetic layer (such as the $Ni_{82}Fe_{18}$ based magnetic layer 303a of FIG. 3); or 2) promote or preserve a free layer 303 microstructure favorable to the MR effect during growth or anneal appear to be more thermally stable than structures without a magnetic barrier layer (e.g., structures such as structure 100 that exposes a $Ni_{82}Fe_{18}$ layer 103a directly to an oxide based seed layer 102). A magnetic layer 303a is then positioned such that the magnetic barrier layer 303c is between an oxide layer 302 and the magnetic layer 303a.

Figure 5:
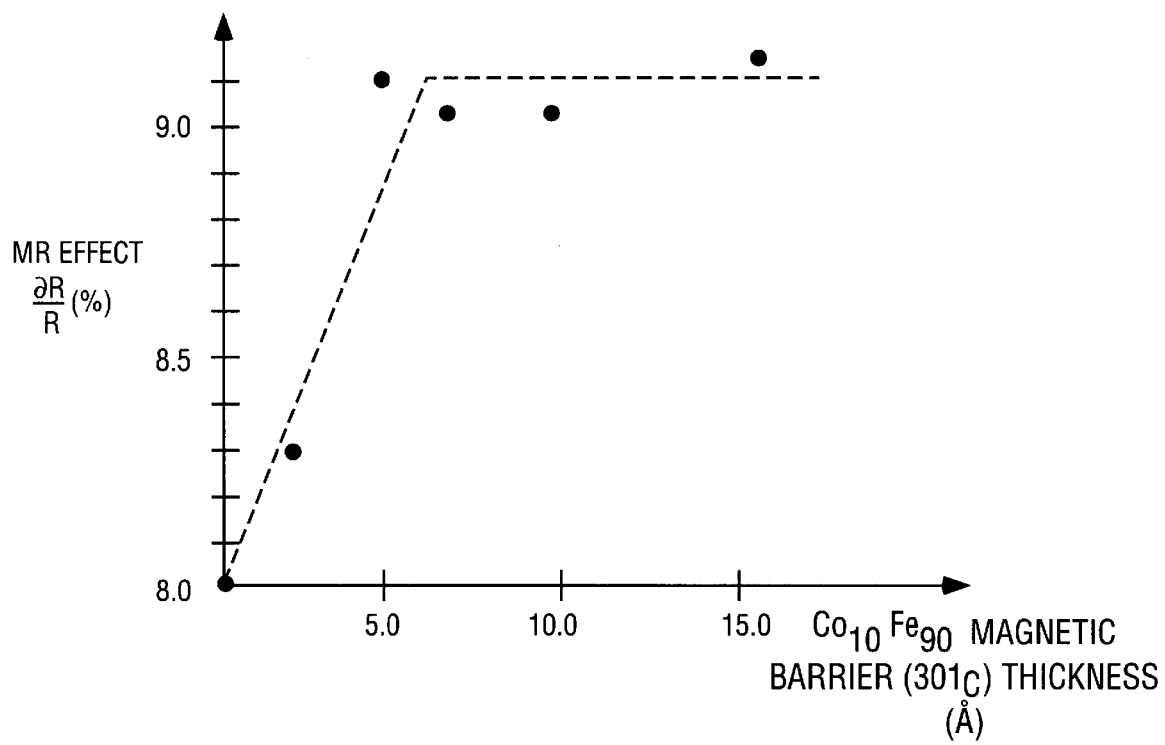
FIG. 5 shows the impact of magnetic barrier layer thickness on the MR effect of the SV structure of FIG. 3.

As mentioned above, in one embodiment the $Co_{90}Fe_{10}$ magnetic barrier layer 303c of structure 300 embodied in FIG. 3 is thin, having a thickness of approximately of 3 Å. FIG. 5 demonstrates the impact of the magnetic barrier layer 303c thickness on the MR effect of structure 300 of FIG. 3. Note that these thicknesses are actual thickness and not effective $Ni_{82}Fe_{18}$ magnetic moment thickness.

As demonstrated in FIG. 5, the MR effect increases with magnetic barrier 303c thickness up to 5 Å before it begins to roll off. Referring back to FIG. 3, this may suggest that the $Co_{90}Fe_{10}$ magnetic barrier layer 303c could be used to completely replace the $Ni_{82}Fe_{18}$ layer 303a within the free layer 303.

Currently, the understanding in the field is that magnetic materials exhibiting reduced anisotropy should be used within free layer 303. This allows the direction of the free layer 303 magnetic moment to be dynamically influenced mostly by the flux lines from the disk rather than the lattice structure(s) of the free layer 303. As such, isotropic lattice structures with soft magnetic properties having low $H_c$ and $H_k$ (such as the cubic based lattice structure associated with $Ni_{82}Fe_{18}$) are typically used within the free layer 303.

Since pure Co is usually hexagonal rather than cubic, pure Co typically exhibits high magnetocrystalline anisotropy. Co based alloys may similarly exhibit high anisotropy. Thus, if the $Co_{90}Fe_{10}$ magnetic barrier layer 303c where to continue to expand in thickness beyond 15 Å, at the expense of $Ni_{82}Fe_{18}$, detrimental effects to the responsiveness of the free layer 303 to flux lines from a rotating disk would be observed.

Nevertheless, thin layers of $Co_{90}Fe_{10}$ (as well as thin layers of other Co based alloys) probably best ensure soft magnetic properties (such as with cubic based grains) within the free layer 303. At a minimum, however, the thickness of the magnetic barrier layer 303c should be sufficient to acceptably eliminate any reaction between the oxide 302 and the magnetic layer 303c. Alternatively, the thickness should be suitable for a microstructure, such as a cubic based structure, that promotes free layer 303 sensitivity to the disk's associated fields.

Xenon gas based ion beam sputtering, having a base pressure of $1 \times 10^{-8}$ torr and a deposition chamber pressure of $1-2 \times 10^{-4}$ torr, was used to form the particular structures described above. The films were deposited under a uniform applied magnetic field (in the direction of the plane of the film) in order to properly orient the magnetization of the films.

It is important to note that oxide layer 302 may be any oxide layer 302 used within MR structures such as, among others, $NiMgO_2$, $NiMnO$ and $Al_2O_3$. Furthermore, other Co alloy potential magnetic barrier layer 303c materials, besides $Co_{90}Fe_{10}$, may be used as well. Note that seed oxide layer 302 is formed upon substrate 301.

Note that consistent with the skills of those who practice in the art, embodiments employing CoFe and NiFe are not limited solely to $Co_{90}Fe_{10}$ and $Ni_{82}Fe_{18}$. That is, element percentages may vary consistent with the general formulations: $Co_xFe_{x-1}$ and $Ni_xFe_{x-1}$. The spacer 304, pinned 305 and antiferromagnetic 306 layer materials may be any available to those skilled in the art that may be used to form an SV sensor.

Figure 6:
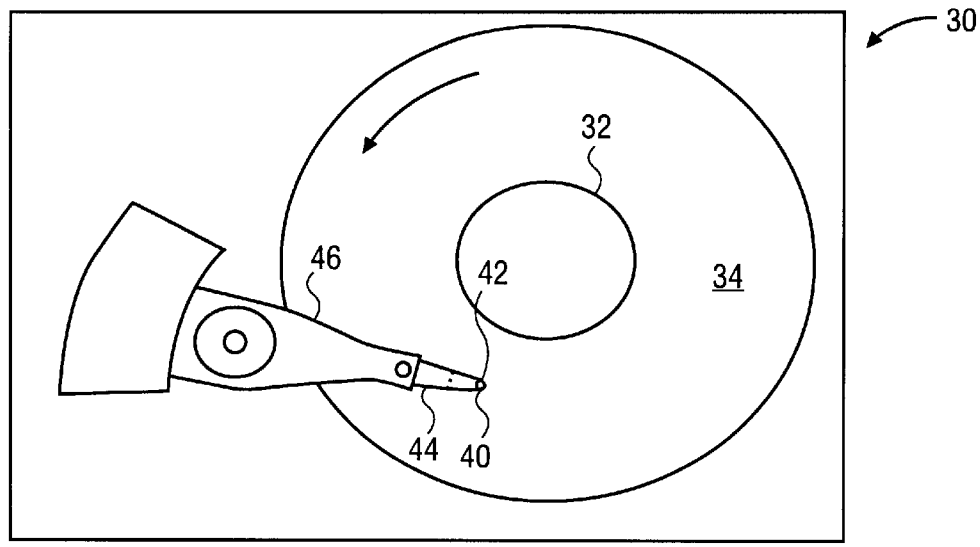
FIG. 6 shows a magnetic disk and activator.
Figure 7:
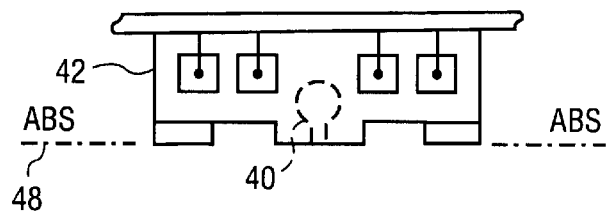
FIG. 7 shows an air bearing surface.
Figure 8:
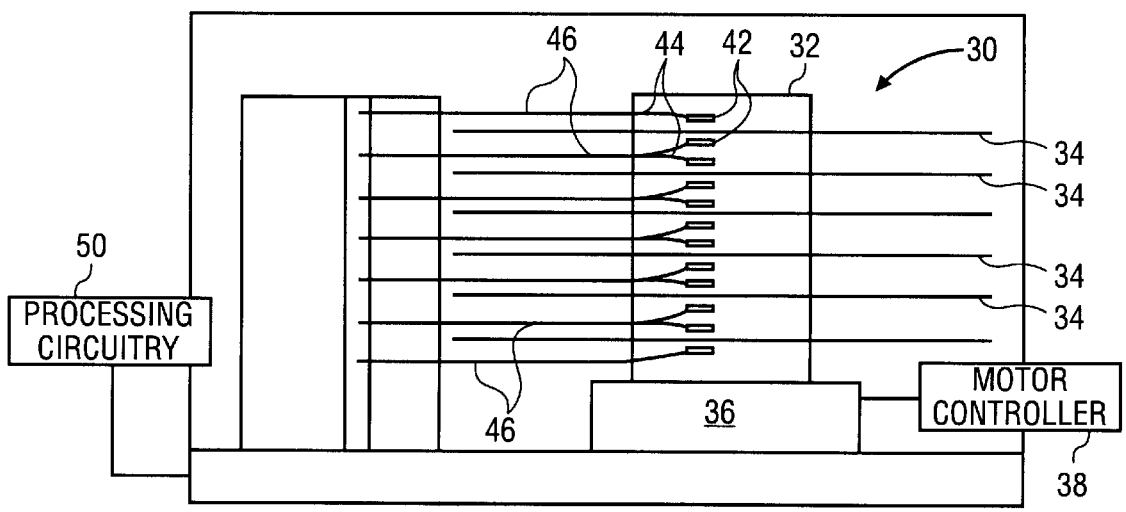
FIG. 8 shows a direct access storage device.

Referring now to the drawings wherein like reference numerals designate like or similar parts throughout the several views, FIGS. 6–8 illustrate a magnetic disk drive 30. The drive 30 includes a spindle 32 that supports and rotates a magnetic disk 34. The spindle 32 is rotated by a motor 36 that is controlled by a motor controller 38. A slider 42 with a combined read and write magnetic head 40 is supported by a suspension 44 and actuator arm 46. A plurality of disks, sliders and suspensions may be employed in a large capacity direct access storage device (DASD) as shown in FIG. 8. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom, Processing circuitry 50 exchanges signals, representing such information, with the head 40, provides motor drive signals for rotating the magnetic disk 34, and provides control signals for moving the slider to various tracks.

What is claimed is:

1. An apparatus comprising a portion of a magnetoresistive structure, said portion of said magnetoresistive structure comprising:
    an oxide seed layer formed upon a substrate; and
    a free layer formed upon said oxide seed layer, said free layer comprising a magnetic barrier layer formed directly on said oxide seed layer, said free layer further comprising a magnetic layer formed directly on said magnetic barrier layer, said magnetic barrier layer inhibiting reaction between said free layer and said oxide seed layer.

2. The apparatus of claim 1 wherein said magnetic barrier layer is a Co alloy.

3. The apparatus of claim 2 wherein said magnetic barrier layer further comprises $Co_xFe_{x-1}$.

4. The apparatus of claim 3 wherein said magnetic barrier layer further comprises $Co_{90}Fe_{10}$.

5. The apparatus of claim 1 wherein said magnetic barrier layer is less than 15 Å.

6. The apparatus of claim 5 wherein said magnetic barrier layer is less than 5 Å.

7. The apparatus of claim 1 wherein said magnetic barrier layer thickness prevents reaction between said magnetic layer and said oxide layer during a high temperature anneal.

8. The apparatus of claim 1 wherein said magnetoresistive structure is an MR spin valve magnetic head.

9. An apparatus, comprising:
    a direct access storage file having a disk for storing data, said disk located proximate to a head used for reading said data from said disk; and
    a portion of a magnetoresistive structure within said head, said portion of said magnetoresistive structure having an oxide seed layer formed upon a substrate and a free layer formed upon said oxide seed layer, said free layer comprising a magnetic barrier layer formed directly on said oxide seed layer, said free layer further comprising a magnetic layer formed directly on said magnetic barrier layer, said magnetic barrier layer inhibiting reaction between said free layer and said oxide seed layer.

10. The apparatus of claim 9 wherein said magnetic barrier layer is a Co alloy.

11. The apparatus of claim 10 wherein said magnetic barrier layer further comprises $Co_xFe_{x-1}$.

12. The apparatus of claim 11 wherein said magnetic barrier layer further comprises $Co_{90}Fe_{10}$.

13. The apparatus of claim 9 wherein said magnetic barrier layer is less than 15 Å.

14. The apparatus of claim 13 wherein said magnetic barrier layer is less than 5 Å.

15. The apparatus of claim 9 wherein said magnetic barrier layer thickness prevents reaction between said magnetic layer and said oxide layer during a high temperature anneal.

16. The apparatus of claim 9 wherein said head is an MR spin valve magnetic head.

* * * * *